C. J. Fay,
Saw Buck.
No. 41,912. Patented Mar. 15, 1864.

Witnesses
Henry Morris
J. W. Coombs

Inventor
C. J. Fay
per Munn & Co.
Attorneys

UNITED STATES PATENT OFFICE.

C. J. FAY, OF HAMMONTON, NEW JERSEY.

IMPROVEMENT IN FOLDING SAW-HORSES.

Specification forming part of Letters Patent No. 41,912, dated March 15, 1864.

*To all whom it may concern:*

Be it known that I, C. J. FAY, of Hammonton, in the county of Atlantic and State of New Jersey, have invented a new and useful Improvement in Saw-Horses; and I do hereby declare that the following is a full, clear, and exact description of the same, reference being had to the accompanying drawings, making a part of this specification, in which—

Figure 2:
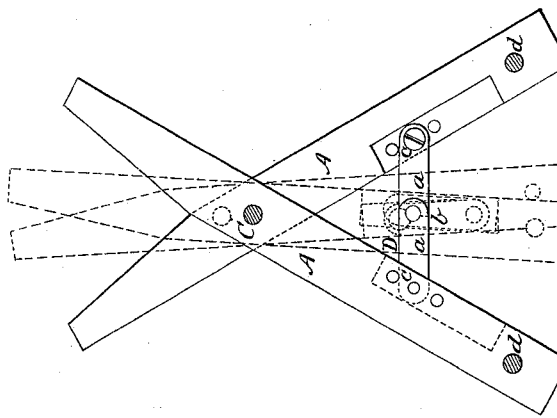
Figure 1:
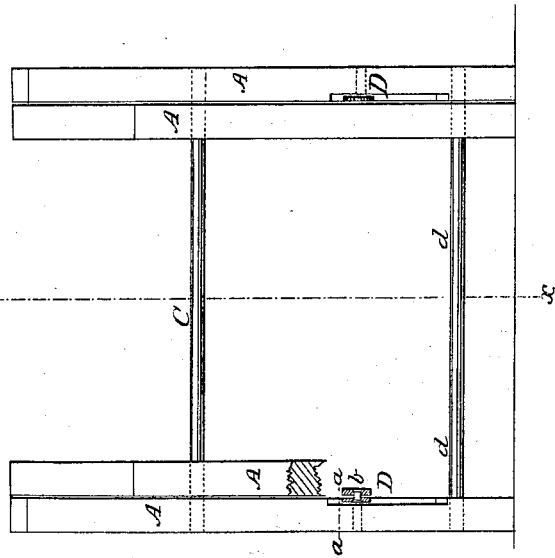

Figure 1 is a side view of my invention, partly in section; Fig. 2, an end view of the same.

Similar letters of reference indicate corresponding parts in the two figures.

The saw-horses hitherto constructed have been rigid or fixed, so as not to be capable of being folded, and consequently they monopolize a great deal of room in being transported from place to place and when packed in storehouses.

My invention consists in constructing the horse in such a manner that it may, when not required for use, be folded in compact form; and to effect this the cross-bars at each end of the horse are allowed to work or turn on the bar which connects them at their junction, each pair of cross-bars being connected by a folding brace, all arranged as hereinafter set forth.

To enable those skilled in the art to fully understand and construct my invention, I will proceed to describe it.

A A represent the two cross-bars at each end of the horse, and C the bar which connects the two pairs of cross-bars at their junction or where they cross each other. The cross-bars A are allowed to turn freely on the ends of the bar C, and the former at each end of the horse below the bar C are connected by a folding or jointed brace, D, formed of two metal plates, *a a*, connected together at one end by a pivot, *b*. The opposite ends of the plates *a a* are attached to the cross-bars by screws *c c*.

By this arrangement the cross-bars A A are allowed to fold together in compact form, as shown in red in Fig. 2, and when said bars are distended for use the braces D have their plates *a a* brought in line with each other, so as to retain the cross-bars in proper position.

The braces D may be attached to the cross-bars at higher or lower points in order to increase or diminish the height of the horse to suit the person using it. Several holes may be made in the cross-bars A to admit of the ready adjustment of the braces to effect this end.

The two pairs of cross bars A are connected by bars or rounds *d* near their lower ends. Thus by this simple means the horses may be compactly folded, and a saving not only effected in transportation and storage, but the horse also more readily carried from place to place by the person who uses it.

Having thus described my invention, I claim as new, and desire to secure by Letters Patent—

A folding or expanding and contracting saw-horse, constructed in the manner substantially as herein shown and described.

C. J. FAY.

Witnesses:
 T. W. FAY,
 EDWD. T. MCKEAN.